(12) United States Patent
Dawson et al.

(10) Patent No.: US 8,128,361 B2
(45) Date of Patent: Mar. 6, 2012

(54) CONTROL MODES FOR EXTENDABLE ROTOR BLADES

(75) Inventors: Mark Dawson, Boise, ID (US); Jack Wallace, Yucaipa, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 509 days.

(21) Appl. No.: 12/339,934

(22) Filed: Dec. 19, 2008

(65) Prior Publication Data

US 2010/0158687 A1    Jun. 24, 2010

(51) Int. Cl.
*F03D 7/00* (2006.01)
*F03D 11/00* (2006.01)

(52) U.S. Cl. ............................................. 416/1; 416/87
(58) Field of Classification Search .................. None
See application file for complete search history.

(56) References Cited

U.S. PATENT DOCUMENTS 2,996,121 A * 8/1961 Stub ................................ 416/88
(Continued)

OTHER PUBLICATIONS

International Search Report and Written Opinion for Application No. PCT/US2009/068003, mailed Oct. 20, 2010.

*Primary Examiner* — Scott B Geyer
(74) *Attorney, Agent, or Firm* — Banner & Witcoff, Ltd.

(57) ABSTRACT

A wind turbine may be controlled in a variety of manners to optimize operating parameters. In one arrangement, for example, the length or the pitch of a wind turbine rotor blade may be adjusted to avoid harmonic resonance frequencies. In another example, the length of a rotor blade may be modified to reduce noise or to optimize profits or both. The controls may be based on data from various types of sensors including accelerometers, sound meters, strain gauges and the like. Actuation of extendable rotor blades can rotate wind turbine rotors without wind or generator pulsing affording multiple advantages. A battery test control may also be used to determine the operational readiness of a battery useful for a variety of purposes in a turbine.

16 Claims, 7 Drawing Sheets

U.S. PATENT DOCUMENTS

| | | | |
|---|---|---|---|
| 4,297,076 A * | 10/1981 | Donham et al. | 416/37 |
| 4,334,823 A * | 6/1982 | Sharp | 416/119 |
| 5,140,856 A * | 8/1992 | Larsen | 73/455 |
| 5,454,694 A * | 10/1995 | O'Dell | 416/197 A |
| 6,612,810 B1 * | 9/2003 | Olsen et al. | 416/95 |
| 6,641,367 B1 * | 11/2003 | Van der Klippe | 416/99 |
| 6,726,439 B2 * | 4/2004 | Mikhail et al. | 415/4.1 |
| 6,752,595 B2 * | 6/2004 | Murakami | 416/87 |
| 6,902,370 B2 | 6/2005 | Dawson et al. | |
| 6,923,622 B1 * | 8/2005 | Dehlsen | 416/87 |
| 6,972,498 B2 * | 12/2005 | Jamieson et al. | 290/55 |
| 7,071,578 B1 * | 7/2006 | Shibata et al. | 290/55 |
| 7,581,926 B1 * | 9/2009 | Dehlsen et al. | 416/87 |
| 7,582,977 B1 * | 9/2009 | Dehlsen | 290/1 R |
| 2007/0286728 A1 | 12/2007 | Hotto | |
| 2009/0232635 A1 * | 9/2009 | Menke | 415/17 |
| 2009/0284016 A1 * | 11/2009 | van Dam et al. | 290/54 |

* cited by examiner

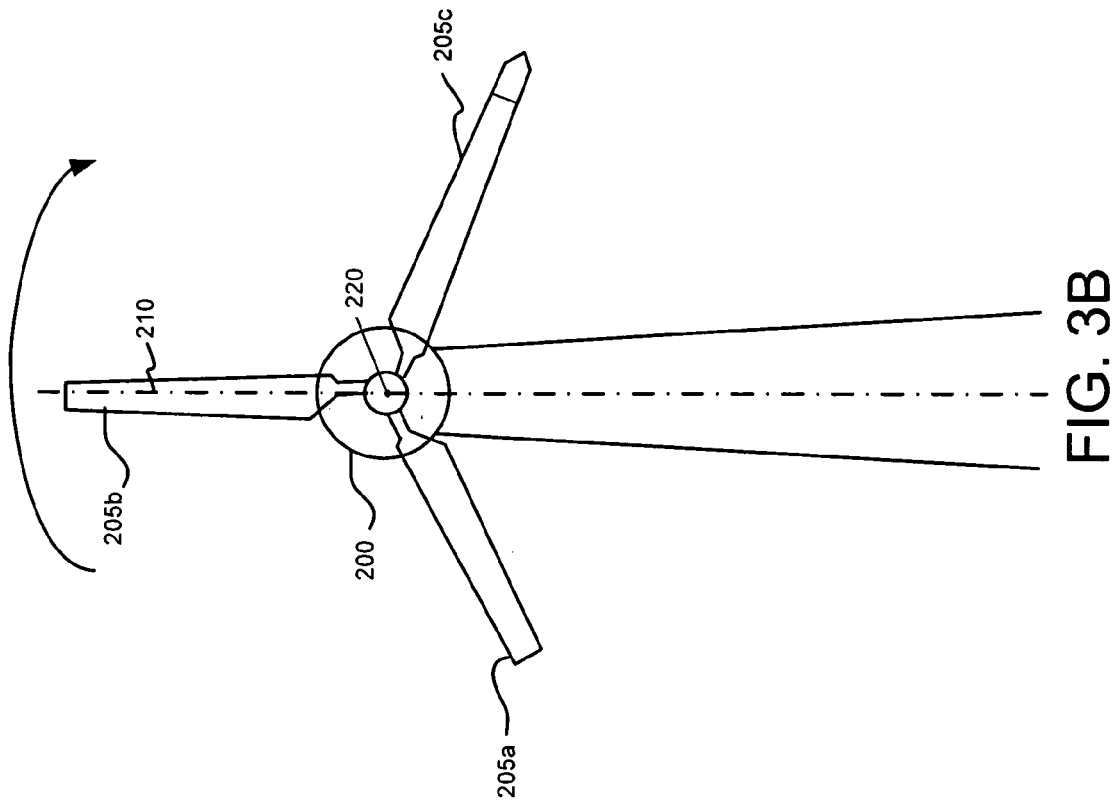
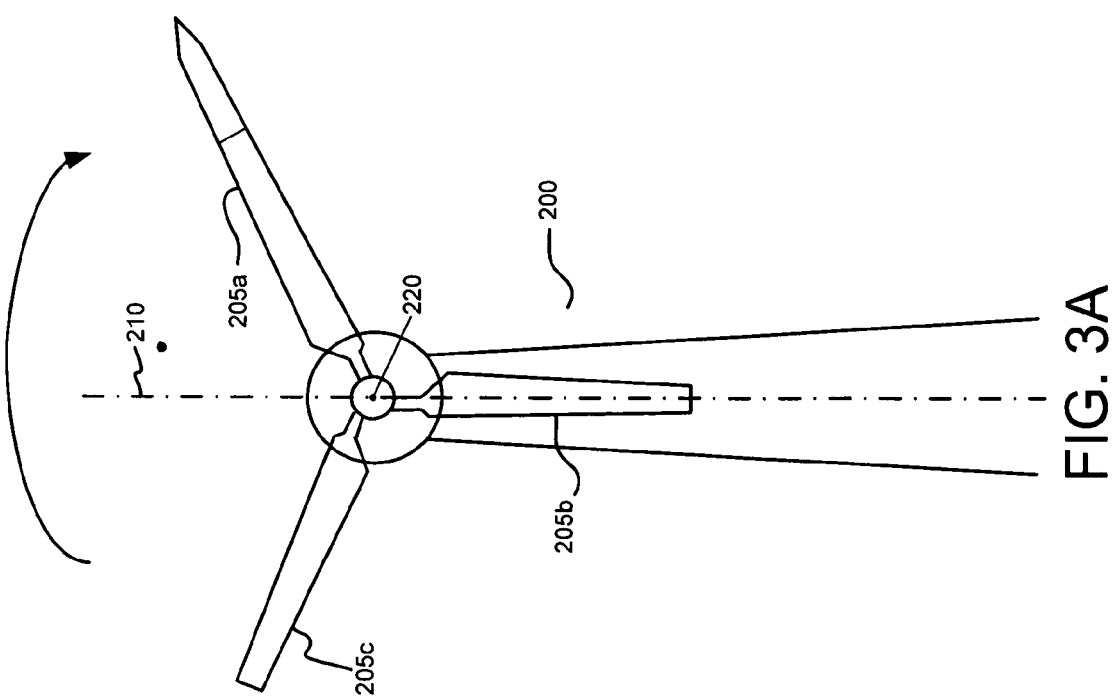

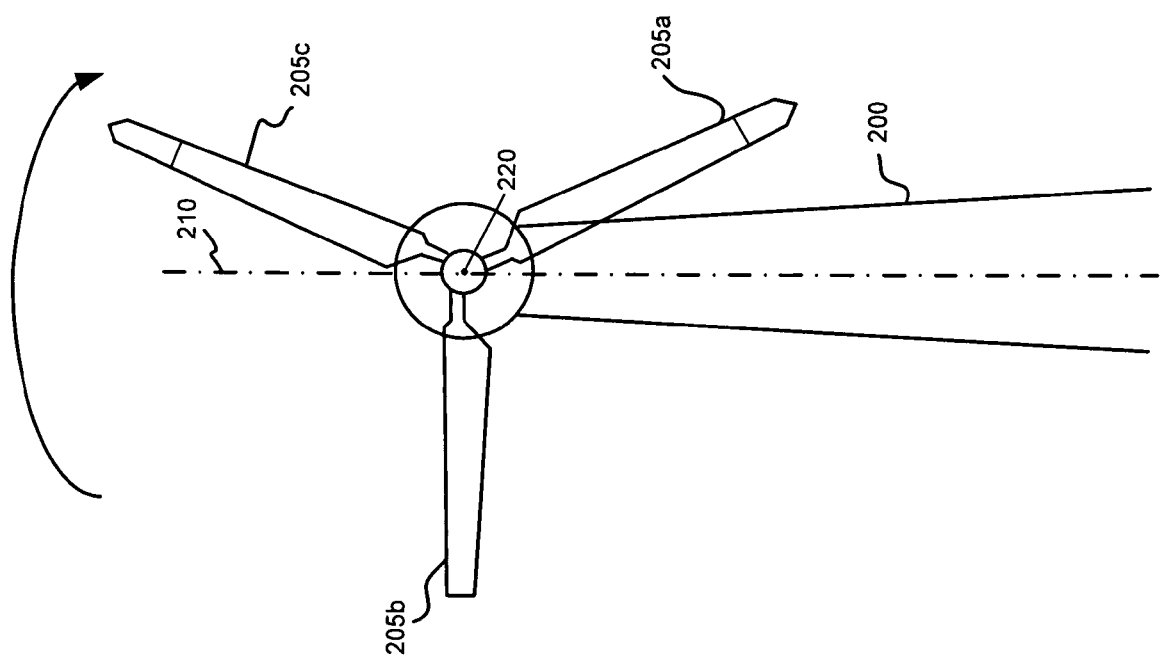

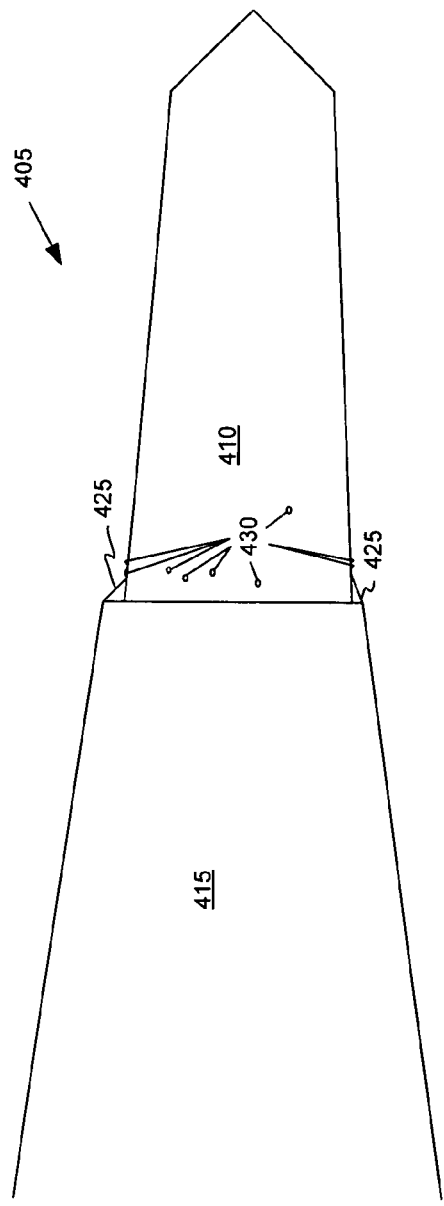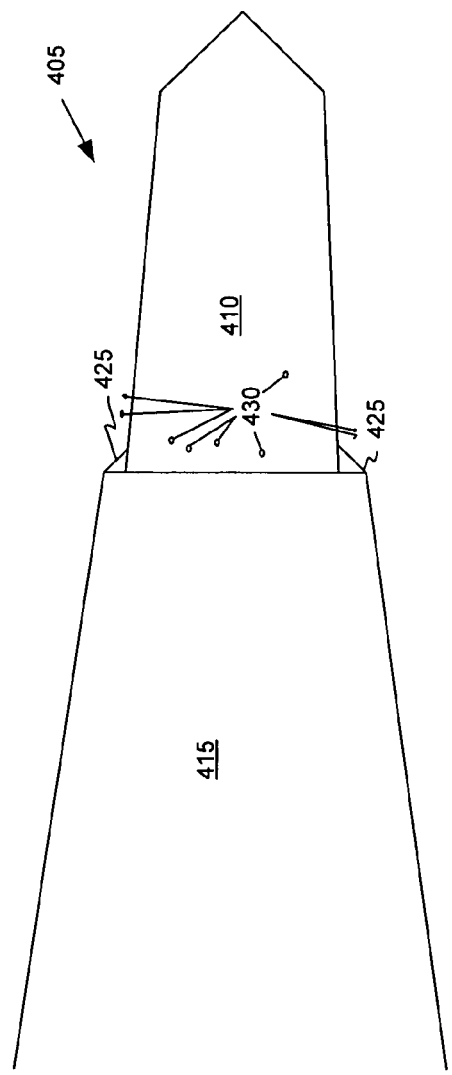

CONTROL MODES FOR EXTENDABLE ROTOR BLADES

TECHNICAL FIELD

The invention relates generally to the design and control of a wind turbine.

BACKGROUND

Wind turbines create power proportional to the swept area of their blades. The choice of rotor attributes for a wind turbine, such as its diameter, is a design trade-off between longer blades for more energy production in low winds and shorter blades for load limitation in high winds. Thus, wind turbines having longer blades will increase the swept area, which in turn produces more power. However, at high wind speeds, or in turbulent winds, a wind turbine having longer blades places greater demands on the components and creates more situations where the turbine must be shut down to avoid damaging components. Even in situations where the average wind speed is not high enough to cause damage, periodic wind gusts which change both the speed and direction of the wind, apply forces that may be strong enough to damage equipment.

Approaches with varying levels of success have been attempted in achieving higher power, fewer shut downs, and fewer instances of damage to components. For example, pitch control has been used to vary the pitch of the blade (i.e., the angle of the blade). On a pitch controlled wind turbine, an electronic controller on the turbine checks the power output of the turbine. When the power output exceeds a certain threshold, the blade pitch mechanism turns the rotor blades to reduce the loads on the rotor blades. The blades are later turned back when the wind drops again. However, pitch control can be fairly slow to respond to changes in the wind and is relatively ineffective to loads imparted by sudden wind gusts.

Stall control is another approach that has been used in an attempt to achieve higher power, and to reduce shut downs and damage to components. In passive-type stall controlled wind turbines, the rotor blades are mounted to the hub at a fixed angular orientation. The stall control is achieved passively by the shape of the blade being such that the blade goes into aerodynamic stall (destroying lift) when the wind speed exceeds a certain threshold. Active-type stall controlled wind turbines exist. In such systems, the rotor blades are adjusted in order to create stall along the blade. However, both types of stall control systems can be difficult to optimize and slow to respond, and may suffer from lower predictability of results than desired. These drawbacks are magnified in conditions with erratic winds and wind gusts.

Variable length rotor blade systems have also been used as an attempt to achieve higher power, and experience fewer shut downs and less damage to components. In such systems, the wind turbine rotor blades are telescopic so that their length can be adjusted based on the wind speed. This provides advantages in that the rotor blades can be extended to provide higher output in low wind conditions and retracted to lower loads in high wind conditions. U.S. Pat. No. 6,902,370 discloses a wind turbine system having telescoping wind turbine rotor blades. While variable length rotor blade systems have certain advantages, they may suffer drawbacks in erratic wind conditions or may be too slow to respond when experiencing a wind gust.

While some proposed turbine control systems use controls that vary blade pitch, speed or length to respond to and adjust power capture and loading of the rotor (see, e.g., U.S. Pat. No. 6,726,439 to Mikhail et al.), it is possible to control turbines with other inputs, such as electrical current; remote inputs from central controllers, signals from sensors not located on the turbine being controlled, or loads sensed on nearby turbines or structures. Additionally, control responses can be modified based on one or more of the following: Utility rates, storm warnings, manual over rides, wind farm physical production limits, wind farm contractual limits, noise limits, operator's long term goals, or utility curtailments. Currently, turbine controls do not integrate these types of inputs, and thus fail to optimize turbine production or to minimize turbine shutdowns and damage due to overloads.

As electricity continues to become a more valuable commodity, and as wind turbines present an environmentally-friendly solution to solve electricity shortage problems, a wind turbine design that overcomes the aforementioned drawbacks and provides increased power and decreased turbine shut downs and damage to components is thus desirable.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Some aspects relate to control modes for controlling the operation of a turbine. For example, a self-rotation control mode may be used to provide rotation without energizing the generator, and without wind. Variable length blades on a first side of the turbine are extended while variable length blades on a second side of the turbine are retracted, thereby creating a rotational force. Additionally or alternatively, by extending and retracting variable length rotor blades, portions of the blades may be cleaned or de-iced.

According to another aspect, control modes may be configured to modify turbine characteristics based on factors including harmonic resonance, turbulence, noise and/or electrical current. For example, during certain times of the day, blade length or pitch may be adjusted to reduce noise so that residents in the area are not disrupted by noise generated by the turbine.

According to another aspect, variable length rotor blades may be balanced on-site without requiring pre-balancing or creation and installation of sets of blades that must be used together. In one embodiment, blade balancing may be conducted by measuring and minimizing vibrations in individual blades. Balancing may be performed at different blade configurations (e.g., full length, half length, fully retracted, etc.) and the balancing data may be stored. During operation, the balancing data may be retrieved to determine appropriate operating lengths for each blade. The rotor may also be balanced dynamically with the turbine running by responding to an accelerometer mounted on the turbine or tower. When swaying is detected, one or more blade lengths can be changed to make them more balanced, reducing the swaying motion.

According to another aspect, a battery test mode may be used, in which a charger for the batteries is switched off and the pitching motors, blade retraction motors and/or other load is employed and the battery voltage is observed. If the battery fails to meet a set of requirements for voltage under a load of certain duration then a flag is set to notify wind farm operators that a new battery is needed. If the battery fails to meet a second set of criteria indicating that the turbine would be unsafe in the event of a power outage, the turbine can be shut down According to another aspect, turbine control responses can be globally (and/or remotely) modified by inputs from a central controller which transmits commands derived from inputs including: wind speed; wind turbulence; ice sensors; energy sales rates; sound sensors or look up tables that estimate sound based on current operations; project or utility limitations; contractual limitations; bug build-up on blades; operations philosophy, or manual over rides. An example would be applying a global command to run at higher than normal loads to maximize income in anticipation of retiring or repowering a project, since long term failures would no longer threaten cash flows. In another example, turbine operating characteristics may be modified to increase power output when energy prices are high to increase profits. In another example, a project may face decreased payments for energy delivered in excess of an annual limit. In this case, total production could be compared to the annual cap. Upon approaching such a cap, generation during low paying periods could be reduced, and the project would produce power only during high rate periods to eliminate excessive run time that decreases turbine life without producing useful income.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 3a-3c illustrate the control mode of FIG. 2 in operation.

FIGS. 4a and 4b illustrate a cleaning operation that may be used for variable length rotor blades according to aspects described herein.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
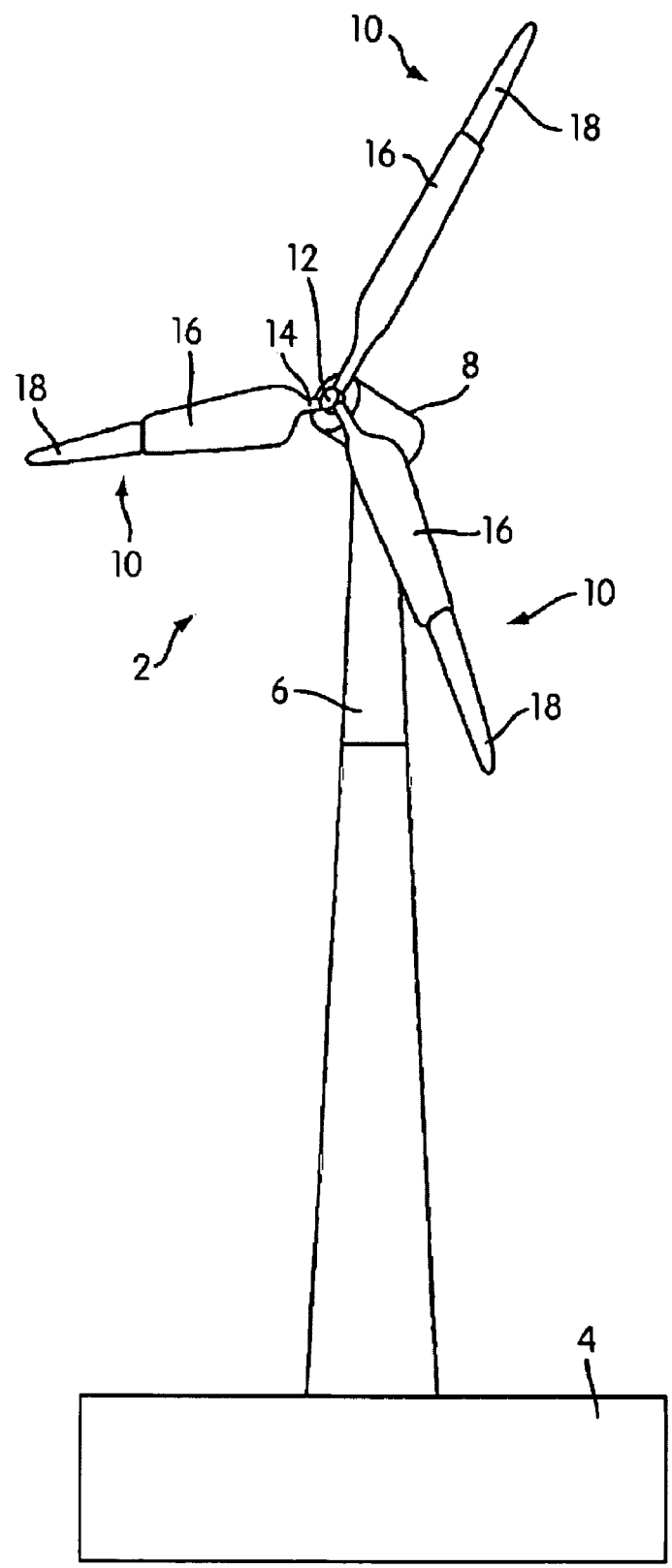
FIG. 1 illustrates a wind turbine according to aspects described herein.

FIG. 1 illustrates a wind turbine 2 on a foundation 4 with a tower 6 supporting a nacelle 8. One or more blades 10 are attached to a hub 12 via a bolt flange 14. The hub 12 is connected to a drive train (not shown) within the nacelle 8. The blades 10 may be variable length blades having a root portion 16 and a tip portion 18. Variable length blades may be configured to extend and retract given certain conditions. Various modes for controlling a variable length blade may be used to optimize or otherwise increase the effectiveness of such blades and/or a turbine such as wind turbine 2 to which the blades are attached.

Figure 2:
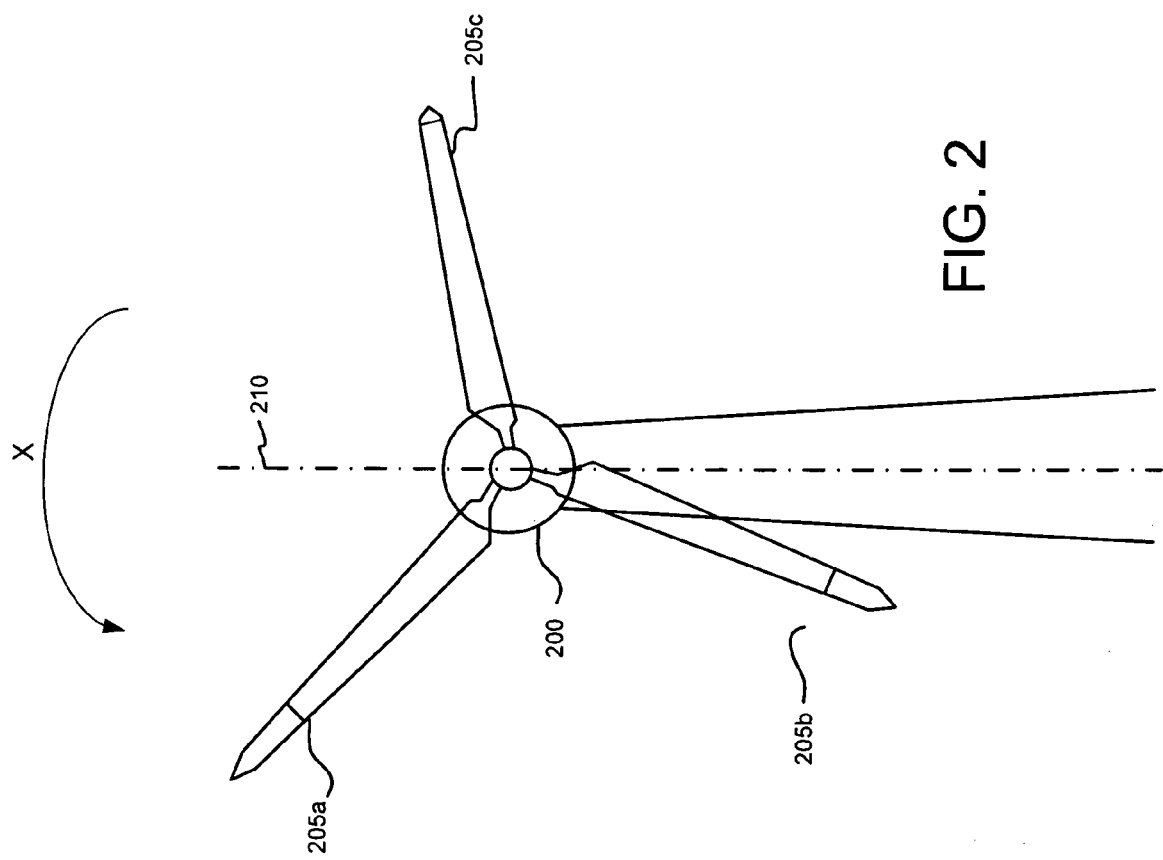
FIG. 2 illustrates a self-rotation control mode according to aspects described herein.

FIG. 2 illustrates a control mode for a wind turbine 200 having extendable rotor blades 205 that allow a turbine rotor to rotate without engaging drive train motors (not shown) and/or without any wind. To achieve such an effect, blades 205a and 205b on a first side of the rotor are extended while blade 205c on a second side is retracted, thereby causing a slow rotation of the rotor. The first and second sides may be defined by an axis intersecting a center of the rotor. For example, in the configuration illustrated in FIG. 2, a vertical axis 210 is used to define a first side (including blades 205a and 205b) and a second side (including blade 205c). Other axes may be defined and used in controlling the extension and retraction of the rotor blades. Although turbine 200 is illustrated as having a counter clockwise rotation, as indicated by arrow X, turbine 200 may also be configured to rotate clockwise. Such a control mode may be useful in giving the appearance of an operating wind turbine when there is no wind. Even more useful is using this rotation to clean the blades or to remove ice with minimal expenditure of energy and without requiring wind. Rotation without wind can also lubricate and keep drive train components warm without using heaters or pumps.

FIGS. 3a and 3b illustrate the clockwise rotation of extendable rotor blades 205, between a first position and a second position. In the first position as illustrated in FIG. 3a, blade 205a is oriented to the right side of the vertical axis 210. In this position, the blade 205a is extended and blades 205b and 205c are retracted. This causes a moment about the rotor axis 220, due to the larger overhung weight of the extended blade 205a, which imparts clockwise rotation to the rotor. In the second position, as illustrated in FIG. 3b, blade 205a has rotated 180 degrees clockwise from the beginning position of FIG. 3a, and is now shown in a shortened length. The following blade 205c is extended, continuing to impart a clockwise turning moment about the turbine axis 220. In general, as blades 205 pass the vertical axis 210, they are lengthened on the right side, and shortened on the left side of FIGS. 3a and 3b to create a clockwise rotation about the turbine axis 220 due to the differences in overhung weights of the blades 205. FIG. 3c represents a position intermediate between the positions shown in FIGS. 3a and 3b. In this position it can be seen that blade 205a has begun to be shortened, while the following blade 205c, having passed the vertical axis 210, is beginning to lengthen. This illustrates the concept that blades are moved between a shortest length, as depicted by blade 205c in FIG. 3a, to a longest length, depicted by blade 205c in FIG. 3b, passing through an intermediate length as depicted by blade 205c in FIG. 3c. The maximum and minimum lengths are not necessarily defined as the maximum extendable length and the minimum retractable length, respectively. The maximum and minimum lengths may be defined as any length depending on various factors such as a speed of rotation desired, mass of a rotor blade 205, the speed of extension and retraction of a rotor blade 205, and the like. Similar controls may be used for counterclockwise rotation of the rotor blades 205.

FIGS. 4a and 4b illustrate a cleaning method using an extension and retraction control mode as described above. FIGS. 4a and 4b illustrate an extendable portion 410 of blade 405 retracting into a root portion 415 of blade 405. For example, during auto-rotation as described above, extendable portion 410 may be retracted as blade 405 is rotated. As extendable portion 410 is retracted, a cleaning element 425 of root portion 415 may scrape or dislodge debris 430 from the surface of extendable portion 410, as shown in FIG. 4b. Thus, if blade 405 has had ice accumulate while the blade 405 was extended, for example, this control mode may be employed to remove the undesired particles. Cleaning element 425 may be inwardly biased (i.e., toward the extendable portion) so that contact between cleaning element 425 and extendable portion 410 is maintained throughout retraction and extension. Because blade 405 may be oriented downward (i.e., towards the ground) during retraction, scraped or dislodged ice, bits of dirt or cleaning solution will fall away from the turbine (i.e., instead of falling on or toward the rotor, another blade or other portion of the turbine). In this manner, water ice or debris does not sully or damage the exterior or interior surfaces of the turbine blades (e.g., blade 405). In one or more arrangements, the control mode may also be used with ice scrapers, ice melters, or cleaning brushes and solution mounted at the outward end of the root blade section to further enhance cleaning efficacy and efficiency.

In addition to cleaning and providing self-rotation, various control modes may also be used to improve the performance of and reduce potential damage to turbines. For example, instead of or in addition to measuring power output and evaluating loads, other blade and turbine factors may be analyzed including turbulence, harmonic resonance, vibration, electrical current, market prices, wind speed, wind turbulence, mechanical attributes at the transition area between the inner and outer blades, and the like. The use of these additional or alternative control factors may increase turbine performance and reduce risks of damage. In one example, monitoring market prices and controlling extendable rotor blades based thereon may boost profits or minimize costs (as described in detail below).

As discussed, measurements of turbulence can be used to control the length of a rotor blade. Turbulence is generally defined by the formula $I=a/U_{avg}$, where "I" corresponds to turbulence intensity, "a" corresponds to the standard deviation of wind speed variations about the mean wind speed and "$U_{avg}$" corresponds to the mean wind speed, (e.g., taken over a 10 minute or one hour interval). Thus, analysis of wind data can produce a turbulence intensity value for various types of wind, which gives an indication of how variable the wind is, and how much gusts vary from the average wind speed. During highly turbulent conditions, it may be preferable to have a shorter blade than would otherwise be used to reduce risk of damage to the turbine. While power output (or other control factors) may be appropriate for controlling blade length under some conditions, peak loads on a wind turbine during high turbulence may significantly increase the likelihood of damage to the turbine regardless of the average power output. Accordingly, a level of turbulence may be factored into the controls analysis to avoid such risks. Conversely, if the wind is sufficiently steady (e.g., amount or magnitude of turbulence below a predefined level) it may be possible to keep the blades a little longer to produce more power than would be prudent in less steady conditions. Additionally or alternatively, control based on turbulence may also be applied to varying pitch in a variable pitch turbine or speed in a variable speed turbine, irrespective of whether the blades are of variable length.

Figure 5:
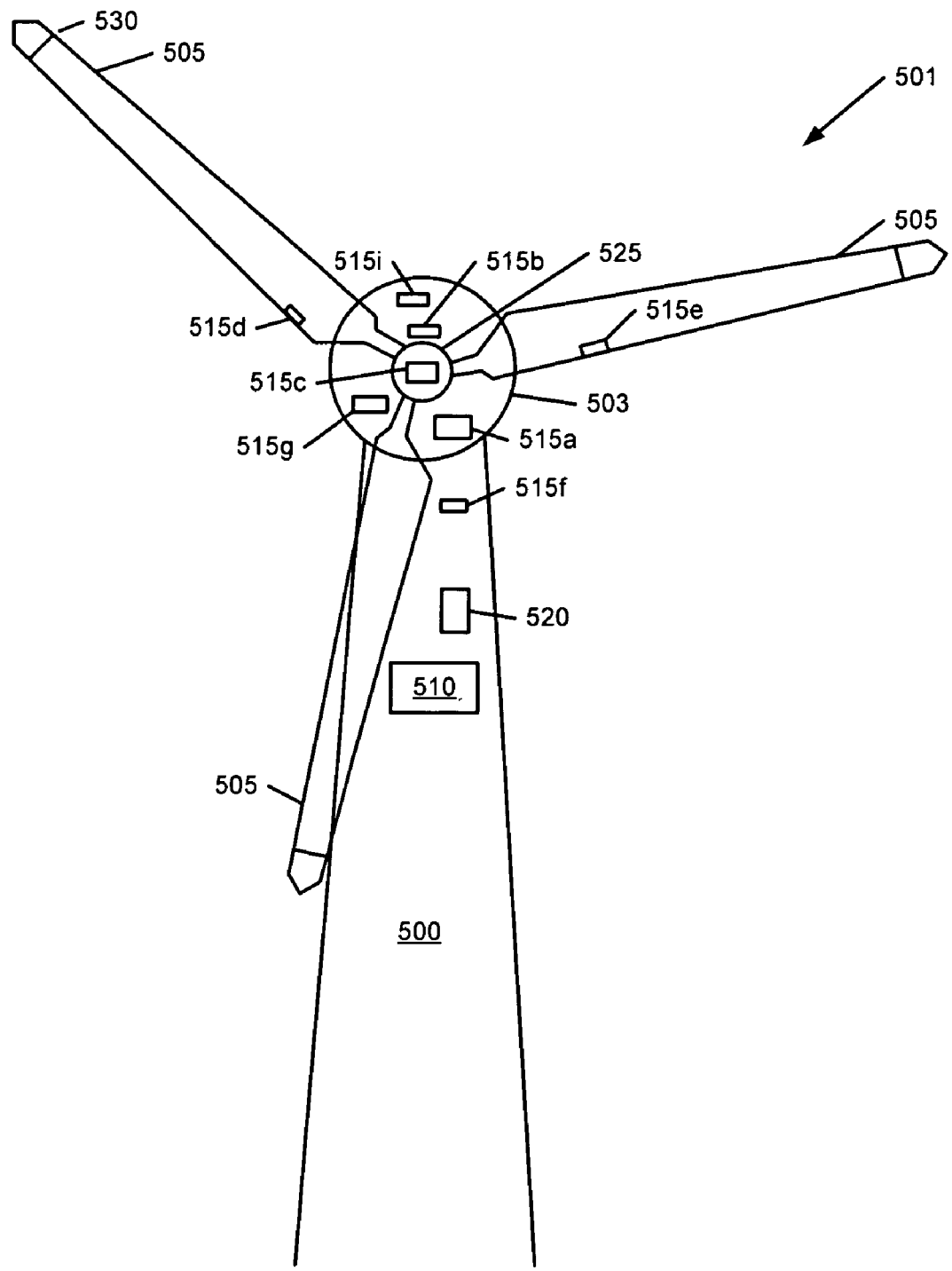
FIG. 5 illustrates a wind turbine having extendable rotor blades and sensors for detecting attributes thereof according to aspects described herein.

FIG. 5 illustrates a wind turbine 501 having variable length rotor blades 505, a turbine control system 510 and various sensors 515 such as wind speed sensor 515a, torque sensor 515b, rotor speed sensor 515c, strain sensors 515d, accelerometers 515e and 515f, sound meter 515g, rotor position sensor 515i and the like. In some instances, sensors may be located in a transition area 530 of a rotor blade 505. Alternatively or additionally, one or more sensors may be located in an extendable tip portion of rotor blades 505. For example, in one configuration, all sensors may be placed in the extendable tip portions of rotor blades 505. Data from sensors 515 is sent to control system 510 so that control system 510 may determine appropriate operating characteristics for wind turbine 501 and adjust corresponding components in accordance therewith. For example, wind speed data from wind speed sensors 515a may be used by control system 510 to determine an amount of turbulence turbine 510 is experiencing. Based on the determined turbulence, the control system may adjust the turbine in various manners such as reducing blade length, pitching blades 505, rotating the turbine 501 and/or combinations thereof to reduce the effects of turbulence or maximize power output. Sensors may be connected to control system 510 and/or a power source (not shown) via wired, fiber optic, or wireless connections.

Another control factor of turbine and blade design is avoiding operation at frequencies that cause harmonic resonance with turbine components such as the rotor blades. Variable speed turbines have an additional challenge in that varying rotor speeds represent another variable that can cause harmonic vibration. With a variable length blade the resonant frequency of that blade changes with length. This increases the challenge of designing the turbine such that the turbine or a component thereof does not experience harmonic resonance. Accordingly, the length of rotor blades may be controlled to avoid harmonic resonance. This can be accomplished using accelerometers to measure vibration or with lookup tables based on a tested machine such that at specific rotational speeds, specific blade lengths are avoided. Thus, in one example, the blade length may be extended or retracted upon detecting the turbine speed approaching or meeting a harmonic resonance frequency of a rotor blade at a current length.

Harmonic resonance occurs when an exciting force coincides in frequency with the natural vibrational frequency of an object. An example of harmonic resonance would be a rotor speed of 20 rpm (0.33 cycles/sec) combined with a blade exhibiting an edgewise vibrational frequency of 1.33 vibrations/sec. Since wind turbine blades exhibit little damping in edgewise vibrations, the blade will tend to have four vibrations for every rotation of the turbine rotor (e.g., 1.33 is four times 0.33). At this particular rotor speed, the blade vibration is excited once per revolution, which is once for every four cycles of the blade vibration. The excitation is simply the weight of the blade, which pushes on alternating sides of the blade as it rotates around the hub. Since the excitation coincides with the natural frequency of the blade, blade vibrations can rapidly increase to dangerous levels. Either changing the rotor speed or the length of the blades will change the frequency ratio to something different than 4:1. If the ratio is not a whole number, the excitation forces will sometimes work in opposition to the natural frequency of the blade, and harmonic vibrations do not occur. Since the vibrational modes of a blade can be calculated and verified by testing, it is possible to determine which combinations of speed and length are conducive to producing harmonic resonance. Field tests can determine how much the system has to be changed from these harmonic conditions in order to prevent harmonic resonance. Those factors can be used in look up tables that allow the controller to avoid dangerous combinations of length and rotor speed.

Referring again to FIG. 5, control system 510 may use accelerometer 515e to measure vibrations in blades 505 or other components of turbine 501. Based on the measured vibrations, control system 510 may detect when harmonic resonance frequencies are being approached and make appropriate adjustments to avoid those frequencies. In one or more arrangements, turbine 501 or control system 510 may include memory that stores lookup tables or other data indicating operating characteristics that would produce harmonic resonance frequencies. The data may include rotational speeds, blade lengths or blade pitches. In one example, a lookup table may indicate that harmonic resonance frequencies would be reached/produced at rotor rotational speeds of 20 rpm and blade lengths of 75 ft. Thus, control system 510 may use the lookup table instead of or in addition to using sensor data such as vibration measurements to provide control commands that would prevent the turbine from running at 20 rpm with a blade length of 75 feet to reduce potentially damaging harmonic vibrations.

In some instances, as illustrated in FIG. 5, blades 505 of wind turbine 501 may need to be balanced with one another in order to avoid vibration due to poor balance. Since the length of a variable length blade such as blades 505 may be modified at any time and in an individual manner, balancing may be conducted on-site using, for example, an accelerometer 515*f* in the nacelle 503 or tower 500 to detect vibration. An accelerometer shows, by the sway of the tower 500, which blade is heaviest: the heavier blade will 'pull' the tower 500 towards it during rotation. A shaft encoder, flags and inductive sensors, or other devices such as those used in robotics to create balance, can indicate which blade is in the position to have caused the sway. This blade would then be shortened, or the other blades lengthened until tower sway falls to an acceptable level. In one example, each of blades 505 would be lengthened or shortened slightly until balance was achieved. The process may be repeated for different degrees of extension such as fully retracted, half extended and full extension. Once the relative positions of the tips for a balanced rotor are known, the lengths of rotor blades 505 at which balance is achieved may be stored in association with one another and/or with a predefined mode (e.g., full extension, half extension, etc.). Subsequently, during normal operation of the turbine 501 control system 510 may adjust the length of each blade 505 based on the stored data. In this way, blades 505 do not need to be pre-matched and shipped in sets. Instead, blades 505 can be interchanged among turbines without requiring replacement of the entire blade set, thereby making blade replacement simpler and less costly. Other sensors that may be used for correcting imbalances may include strain gauges and vibration switches.

Another control technique for turbines such as turbine 501 is controlling for noise. In particular, turbine 501 may include a sound meter 515*g* to detect a level of noise. Noise controls may be used to avoid noise violations or complaints in more densely populated or residential areas. For example, during the daytime (e.g., between the hours of 9 AM-6 PM), residents within the area might not be concerned with noise since many may be at work or performing other activities where noise is not an issue. At night, however, when residents may be sleeping or resting (e.g., watching television or listening to the radio), noise may become a significant source of disruption. Thus, at night, control system 510 may be used to reduce noise to tolerable levels while during the day, the noise level may be set higher.

Referring again to FIG. 5, based on the detected level of noise, control system 510 of turbine 501 may modify various components or characteristics of turbine 501 to adjust the level of noise to within acceptable levels. Typical wind turbines have a tip speed of about 150 miles per hour. Depending on blade 505 pitch, this speed can produce significant noise. Either decreasing tip speed, or changing pitch can reduce noise levels. Tip speed is reduced by slowing the rotor 525 or reducing the length of blades 505. For example, a rotor 525 of turbine 501 can be controlled to adjust speed or blades 505 may be adjusted for pitch, both of which impact noise. Additionally, control system 510 may adjust blade length to control the noise level since tip speed is directly related to noise and blade length is directly related to tip speed. For instance, on a constant speed turbine, tip speed increases linearly with blade length. Accordingly, noise production may be used as an alternative or additional limiting factor for controlling blade length. Instead of or in addition to detecting the level of noise using a sensor, control system 510 may include a database storing predefined noise data. For example, the database may identify certain conditions (e.g., blade lengths, vibrations, blade pitches, rotational speed, wind speeds, etc.) that correspond to particular levels of noise. Thus, control system 510 may look up the conditions in the database to determine a corresponding level of noise, compare that level to a setpoint, and adjust turbine operations to reduce noise if the setpoint is exceeded. Some wind projects have noise level limits as part of their operating permits. These noise level limits may vary over time, such as a requirement to run more quietly at night. Controlling pitch, speed or blade 505 length, or any combination thereof, can allow turbines to operate over a wide range of wind speeds while complying with noise requirements.

Additionally or alternatively, while some current turbine control systems use power output as a control factor, it is also viable to use current as a control factor (e.g., for controlling the length of a variable length rotor blade, the pitch of a variable pitch turbine, the speed of a variable speed turbine, or any combination of length, pitch or speed.). Because grid voltage does not tend to vary much in most locations, error associated with using current may be tolerable. Further, it is current, not power, that determines heat loading of devices. Accordingly, heat loading may be monitored and limited using current-based turbine controls. For example, in FIG. 5, control system 510 of turbine 501 may extend or retract rotor blades 505, adjust rotor 525 speed, modify blade 505 pitch and the like based on current readings. Using controls based on current instead of power output may eliminate the need for voltage transducers and signal processors to calculate power from voltage and current signals. Such configurations may thus remove two sources of potential component failure. Current may be measured using a variety of devices including current sense integrated circuits, multimeters, power supplies, current transformers, and the like.

Figure 6:
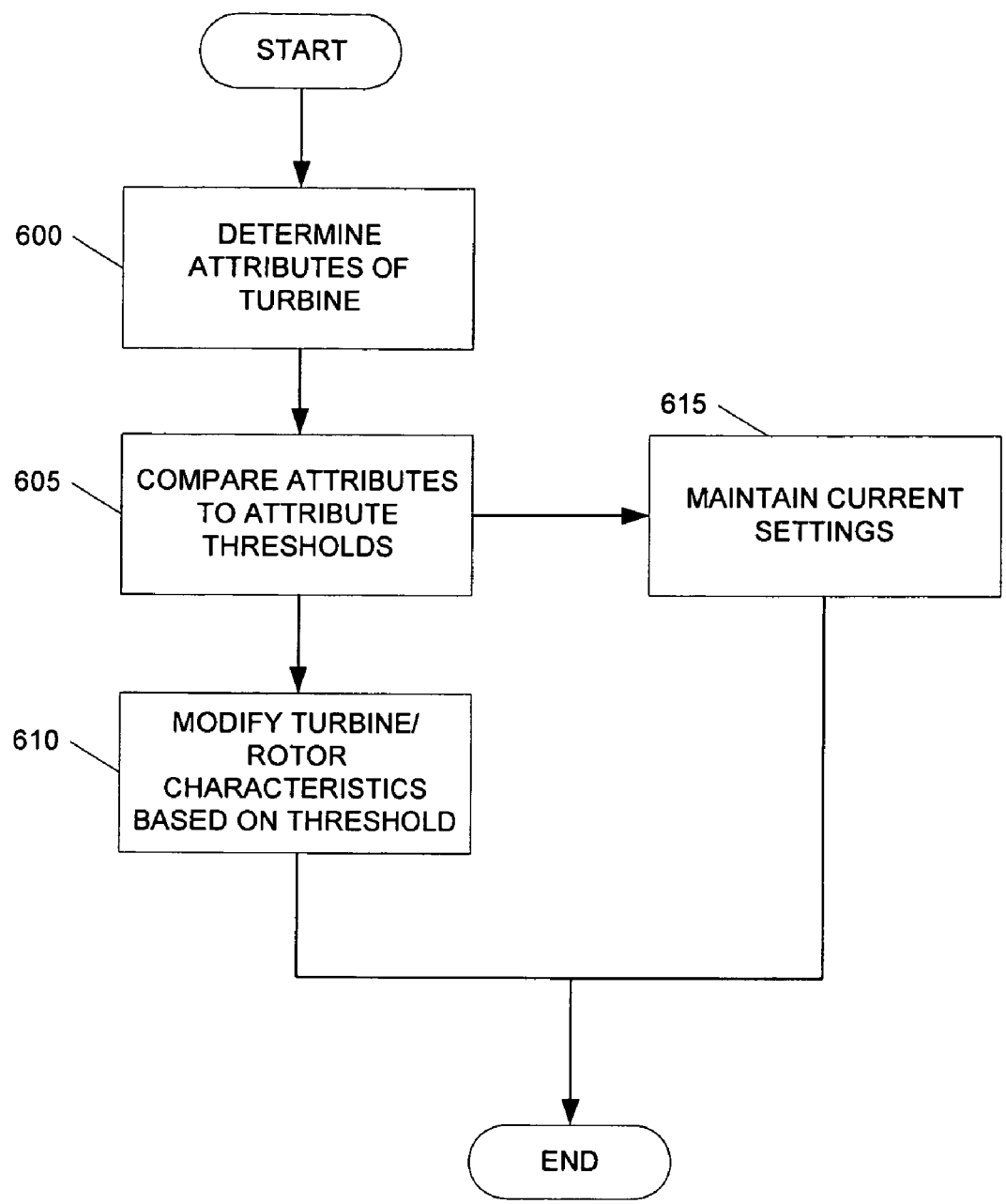
FIG. 6 is a flowchart illustrating a method for controlling various wind turbine operating characteristics in accordance with one or more aspects described herein.

FIG. 6 is a flowchart illustrating a method for adjusting blade or turbine characteristics based on various control factors. In step 600, one or more attributes of a wind turbine (e.g., turbine 501 of FIG. 5) may be determined by a turbine control system such as control system 510 (FIG. 5). The control system may determine attributes such as a level of turbulence, an electrical current, a noise level, vibrations, wind speed, wind turbulence, the presence of external commands from a central control system, and the like. In step 605, the control system may compare each attribute to a corresponding attribute threshold to determine whether the attribute exceeds the threshold. For example, a level of turbulence may be compared with a turbulence threshold based on potential risk of damage to the turbine. In another example, a level of noise may be compared with predefined noise level thresholds (e.g., time-dependent noise levels) to determine whether the noise is too high at that time. Different thresholds may be defined for different operating characteristics such as different blade lengths, different pitches, different rotor rotational speeds, different central control system commands, and/or combinations thereof.

Continuing with FIG. 6, if the attribute exceeds the threshold, turbine and/or blade characteristics may be modified or otherwise adjusted to a predefined level or to a degree where the level of the attribute does not exceed the associated threshold in step 610. The adjustments may include shortening or lengthening an extendable blade, pitching the blades, slowing rotation and the like. If, however, the attribute(s) do not exceed the threshold, turbine and/or blade characteristics may be maintained at a current setting in step 615. Alternatively or additionally, if the attributes are a predetermined level below the threshold, turbine and/or blade characteristics may be modified or otherwise adjusted to a degree where the level of the attributes approaches the threshold level, thereby increasing turbine productivity.

From an economic perspective, energy sales prices may also be taken into consideration as an additional or alternative control factor. Most wind turbine control points are set to ensure a long turbine life. However, it may be desirable at certain energy sales price points to sacrifice some of the turbine's life for additional profit or income. A turbine controller could use energy sales price data as one of its inputs to either increase the turbine's maximum power output, or more aggressively approach the 'knee' of its power curve or otherwise risk greater wear and tear in order to take advantage of high energy sales prices. In a turbine equipped with a variable length blade this would mean a control strategy where the blades are kept longer than they would be otherwise in order to produce additional energy with the option of increasing the maximum power output as well. In addition to blade length, pricing control strategies may also affect how blade pitch and turbine speed are controlled.

One method of determining how much more load to apply to turbine components during periods of high energy prices would be to compare lifetime cost of operation to income. Operating costs generally increase with increased loads, because increased loads directly affect component life. Component life can be calculated using fatigue analysis, comparison with operational records, or other methods. As the result of a cost analysis such as this, a look up table can be created, which would allow a controller, such as control system 510 (FIG. 5), to use varying setpoints in response to varying sales prices of energy. This will generally result in operational setpoints that will vary at different times of the day, on different days of the week, and/or seasonally, based on utility rates. An example would be to reduce loads when energy sales prices are low since the small potential increase in income will not pay for additional maintenance due to increased loads. On the other hand, there may be energy sales prices that are so high that increased revenues will greatly exceed the projected cost of increased maintenance caused by pushing the turbine harder. This might occur for a few hours a day, when utilities pay dearly for power, such as at 6 PM on a summer weekday in a hot climate, when the workforce comes home, turns on the air conditioner and cooks dinner. This places a large demand on the power generation and transmission system, and the utility must find sources to meet that demand. During these periods of high energy sales prices, more aggressive setpoints may be instituted by the controller.

According to another aspect, batteries are often an important part of wind turbine safety systems. For example, batteries may be used in some turbines to pitch the blades out of the wind if the power goes out. In a turbine using variable length blades, batteries may be used to pull the blades all the way into a retracted position in case of a power outage. In either case, it is important to have batteries with sufficient charge. Thus, to insure that a battery has sufficient charge, a special battery test control mode may be used. In the battery test mode, a charger for the batteries is switched off and the pitching motors, blade retraction motors and/or other load is employed and the battery voltage is observed. If the battery fails to meet a set of requirements for voltage under a load of certain duration then a flag is set to notify wind farm operators that a new battery is needed. If the battery fails to meet a second set of criteria indicating that the turbine would be unsafe in the event of a power outage, (i.e.: the batteries would be incapable of performing their function), the turbine can be shut down. Alternatively, battery voltage can be continuously monitored under normal operating loads, and these voltages can be compared to setpoints which indicate when a battery is becoming weak or non-functional, triggering associated alarms or turbine shutdowns. For example, a turbine or a portion thereof may be shutdown if the battery does not have sufficient charge.

Referring again to FIG. 5, an example of batteries that may be used in accordance with the above is illustrated. In particular, batteries 520 are located in the hub and may provide power to blade retraction/extension mechanisms, sensors, pitching mechanisms and the like. Batteries 520 may be charged through another power source.

As a fail safe or alternate mode, manual controls may be provided. Manual controls may be used to adjust pitch or length of blades, rotor speed, or turbine direction among other characteristics in the event controllers or sensors fail or special circumstances call for different operating attributes.

The inventions disclosed herein entail improvements to wind turbine controls and blade design, which may be applicable to a variable length blade turbine such as described in U.S. Pat. No. 6,902,370 as well as to conventional wind turbine blades and other aerodynamic structures such as aircraft wings or helicopter blades.

Additionally, the methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for rotating a rotor without engaging a drive train motor comprising:
    adjusting an extendable blade connected to the rotor to a first length when the rotor is in a first position, wherein the first length is different than a second length of a second blade connected to the rotor; and
    adjusting the extendable blade to a third length upon the rotor rotating to a second position.

2. The method of claim 1, wherein the first length is greater than the second length and wherein adjusting the extendable blade to the first length causes the rotor to rotate.

3. The method of claim 1, wherein the extendable blade is gradually retracted between the first position and the second position.

4. The method of claim 1, wherein the first position corresponds to a position where a tip of the extendable blade is at or near a maximum height and wherein the first length corresponds to a maximum extendable length.

5. The method of claim 1, wherein a tip of the extendable blade is angled downward in the second position and wherein adjusting the extendable blade to the third length includes cleaning an extendable tip portion of the extendable blade.

6. The method of claim 1, wherein adjusting the extendable blade to the third length includes de-icing an extendable tip portion of the extendable blade.

7. A method of battery test comprising:
- modifying at least one of a pitch and a length of a variable length rotor blade of a turbine using battery power from a battery;
- monitoring a voltage of the battery while the at least one of said pitch and said length is modified;
- determining whether the voltage of the battery meets a set of requirements; and
- in response to determining that the voltage of the battery does not meet the set of requirements, generating a notification that the battery should be replaced.

8. The method of claim 7, wherein the notification includes a shutdown signal to stop operation of at least one of: the variable length rotor blade and the turbine.

9. One or more non-transitory computer readable media storing computer readable instructions that, when executed, cause an apparatus to:
- rotate a rotor without engaging a drive train motor, wherein rotating the rotor includes:
  - adjusting an extendable blade connected to the rotor to a first length when the rotor is in a first position, wherein the first length is different than a second length of a second blade connected to the rotor; and
  - adjusting the extendable blade to a third length upon the rotor rotating to a second position.

10. The one or more non-transitory computer readable media of claim 9, wherein the first length is greater than the second length and wherein adjusting the extendable blade to the first length causes the rotor to rotate.

11. The one or more non-transitory computer readable media of claim 9, wherein the extendable blade is gradually retracted between the first position and the second position.

12. The one or more non-transitory computer readable media of claim 9, wherein the first position corresponds to a position where a tip of the extendable blade is at or near a maximum height and wherein the first length corresponds to a maximum extendable length.

13. The one or more non-transitory computer readable media of claim 9, wherein a tip of the extendable blade is angled downward in the second position and wherein adjusting the extendable blade to the third length includes cleaning an extendable tip portion of the extendable blade.

14. The one or more non-transitory computer readable media of claim 9, wherein adjusting the extendable blade to the third length includes de-icing an extendable tip portion of the extendable blade.

15. One or more non-transitory computer readable media storing computer readable instructions that, when executed, cause an apparatus to:
- modify at least one of a pitch and a length of a variable length rotor blade of a turbine using battery power from a battery;
- monitor a voltage of the battery while the at least one of said pitch and said length is modified;
- determine whether the voltage of the battery meets a set of requirements; and
- in response to determining that the voltage of the battery does not meet the set of requirements, generate a notification that the battery should be replaced.

16. The one or more non-transitory computer readable media of claim 15, wherein the notification includes a shutdown signal to stop operation of at least one of: the variable length rotor blade and the turbine.

* * * * *